E. H. CARROLL.
VEHICLE BRAKE.
APPLICATION FILED DEC. 29, 1910.
992,848.
Patented May 23, 1911.
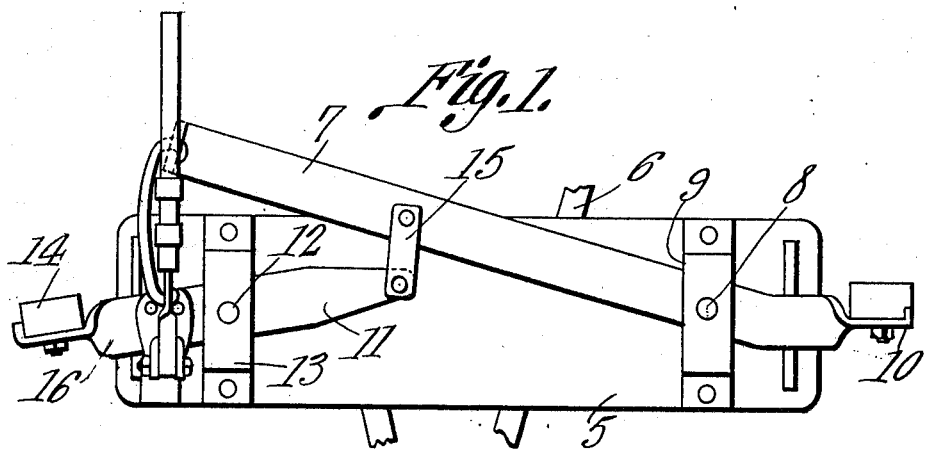
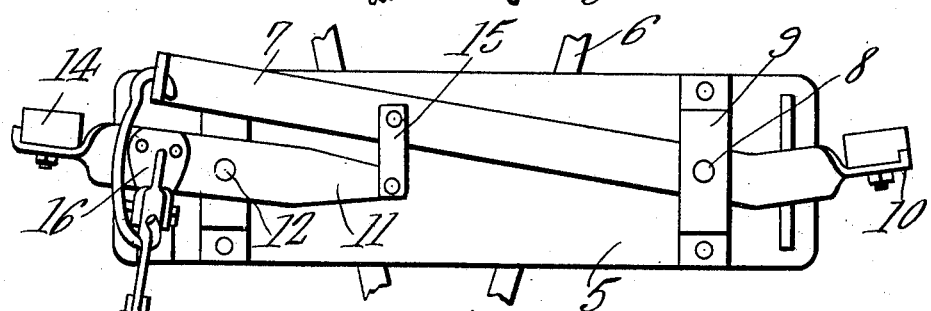
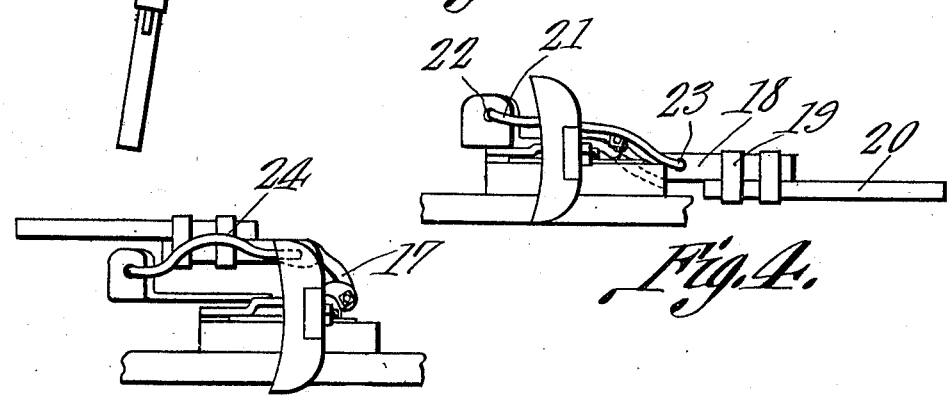
Eason H. Carroll,
Inventor

UNITED STATES PATENT OFFICE.

EASON H. CARROLL, OF CLANTON, ALABAMA.

VEHICLE-BRAKE.

992,848.

Specification of Letters Patent.   Patented May 23, 1911.

Application filed December 29, 1910. Serial No. 599,802.

*To all whom it may concern:*

Be it known that I, EASON H. CARROLL, a citizen of the United States, residing at Clanton, in the county of Chilton and State of Alabama, have invented a new and useful Vehicle-Brake, of which the following is a specification.

It is the object of the present invention to provide an improved construction of vehicle brake and the invention aims primarily to provide a brake of this class so constructed that a maximum pressure may be applied to the wheels, with which the brake is to coöperate, without the exertion of any considerable manual force.

The invention aims further to provide a brake of this class so constructed that when the operating lever therefor is swung to set position, it will automatically lock and the brake parts will be securely held in set position until the lever is released. In this connection, the invention aims to so construct and arrange the lever and the means which holds the same in locked position, that the lever may be readily released from locked position and will automatically return to normal position or nearly to this position when so raised.

With the above and other objects in view, the invention consists generally, in the construction and arrangement of parts shown in the accompanying drawings in which,—

Figure 1 is a plan view of a brake constructed in accordance with the present invention, the brake being shown in normal condition. Fig. 2 is a similar view, but showing the brake set. Fig. 3 is a side elevation of the brake, the same being shown in normal position; and Fig. 4 is a view similar to Fig. 3 but showing the brake in set position.

As shown in the drawings, the elements comprising the brake embodying the present invention are mounted upon a board 5 which is secured upon the hounds 6 of the vehicle and the brake embodies among other elements a brake lever 7 which is of considerable length and is pivoted as at 8 through a bracket 9 upon the said board 5. This brake lever carries at its outer end a brake shoe 10 of any approved construction and extends generally in the direction of the length of the board with its opposite end terminating short of the other end of the said board as is clearly shown in the plan view of the drawings. The brake also includes a brake lever 11 which is considerably shorter than the lever 7 and is pivotally mounted as at 12 in a bracket 13 above the board 5, this bracket 13 being identical in construction with the bracket 9 and being similarly located (that is near one end of the board 5). Also, the lever 11 is provided at its outer end with a brake shoe 14 of the same construction as the shoe 10.

A link 15 is connected pivotally at its ends with the inner end of the brake lever 11 and with the lever 7 between its ends so that pivotal movement of one lever will result in a like movement of the other member in an opposite direction. There is secured upon the lever 11 between its pivot 12 and its outer end, a bracket 16 which has a downbent rearwardly extending portion 17 to which is pivoted the lower end of an operating lever of which the body section is indicated by the numeral 18, there being connected with this lever by suitable straps 19, a handle section 20. A link 21 is pivotally connected as at 22 to the upbent inner end of the lever 7 and at its rear end has similar connection as at 23 with the operating lever section 18 and between its ends this link is upwardly bowed as at 24, it being preferably of resilient rod material.

It will be observed from an inspection of the several figures of the drawings, and particularly Figs. 3 and 4 thereof that the points of pivotal connection between lever 7 and operating lever 18, when the brake is in normal condition, or in other words the condition illustrated in Fig. 3 of the drawings, are in a line extending above the pivot for the operating lever 18, but when this lever is swung rearwardly to assume the position shown in Fig. 4 of the drawings in which position the brake will be set, the said pivot point will be then located in a line extending below the pivot for the operating lever, this pivot being received, so to speak, in the concavity 24 of the link 21. From this it will be understood that as the operating lever is swung over from the position shown in Fig. 3 of the drawings to the position illustrated in Fig. 4 thereof, it will at one point in its movement pass the line of dead center, which line passes theoretically through the pivots 22 and 23 and the pivot for the said operating lever so that when the lever has passed this point it will be firmly locked against return movement. It will still further be understood that inasmuch as the link 21 is resilient, it will tend to straighten as the lever passes the line of dead center, at which time the link is under greatest stress and that after the lever has passed this position and has assumed the position shown in Fig. 4 of the drawings, it will exert a constant tension on the lever holding it against return movement until manually thrown from the position shown in Fig. 4. It will be understood that when the brake is employed in connection with the rear wheels of a vehicle, a cable or operating lever may be connected with the lever 18, whereby the brake may be unset or released from a position near the driver's seat although such construction is at the option of the user of the brake, and, inasmuch as it forms no part of the present invention, has not been herein shown nor specifically described.

What is claimed is:

In a brake, mutually connected shoe carrying brake levers, an operating lever pivoted upon one of the brake levers, and a bowed resilient link pivotally connected to the other brake lever and to the operating lever, the pivots being so located that the points of connection between the link and the last mentioned brake lever, and, the link and operating lever, will be normally in a line above the pivot for the operating lever, and in line below said pivot when the brake is set, movement of the lever to bring the point of connection between the link and the last mentioned brake lever, the link and the operating lever, and the pivot for the operating lever, all in alinement, being against the tension of said link and tending to straighten its bowed portion.

In testimony that I claim the foregoing as my own, I have hereto affixed my signature in the presence of two witnesses.

EASON H. CARROLL.

Witnesses:
TIPTON MULLINS,
EMMA GUINN.

Copies of this patent may be obtained for five cents each, by addressing the "Commissioner of Patents, Washington, D. C."